United States Patent [19]

Lutz

[11] 4,366,466

[45] Dec. 28, 1982

[54] APPARATUS FOR PREVENTING UNAUTHORIZED STARTING OF A MOTOR VEHICLE

[75] Inventor: Horst Lutz, Ditzingen, Fed. Rep. of Germany

[73] Assignee: Daimler-Benz Aktiengesellschaft, Stuttgart, Fed. Rep. of Germany

[21] Appl. No.: 132,411

[22] Filed: Mar. 21, 1980

[30] Foreign Application Priority Data

Mar. 22, 1979 [DE] Fed. Rep. of Germany ....... 2911160

[51] Int. Cl.³ .......................... B60R 25/00; G07C 5/08
[52] U.S. Cl. ...................................... 340/64; 180/287;
307/10 AT; 340/825.31; 361/172
[58] Field of Search ................ 340/63, 64, 53, 825.31;
307/10 AT; 180/287; 361/172

[56] References Cited

U.S. PATENT DOCUMENTS

| Re. 29,259 | 6/1977 | Sabsay | 340/825.31 X |
| 3,624,608 | 11/1971 | Altman et al. | 340/825.31 |
| 3,944,976 | 3/1976 | France | 340/825.31 X |
| 4,072,850 | 2/1978 | McGlynn | 340/53 X |
| 4,205,325 | 5/1980 | Haygood et al. | 340/63 X |
| 4,206,491 | 6/1980 | Ligman et al. | 307/10 AT |
| 4,236,594 | 12/1980 | Ramsperger | 307/10 AT X |
| 4,298,792 | 11/1981 | Granholm et al. | 340/63 X |

FOREIGN PATENT DOCUMENTS 2018482 10/1979 United Kingdom ................. 340/63

Primary Examiner—John W. Caldwell, Sr.
Assistant Examiner—Joseph E. Nowicki
Attorney, Agent, or Firm—Paul M. Craig, Jr.

[57] ABSTRACT

An arrangement for preventing an unauthorized starting of vehicles which includes a data carrier preferably connected to a key provided for mechanical locks of the motor vehicle and with an evaluating circuit triggering a signal if the correct information is introduced into the arrangement. The data carrier contains at least one of unerasable vehicle-related information or erasable arbitrary information. The evaluating circuit includes at least one read/write unit and a comparison unit wherein the total data of the data carrier are examined and which, in addition to the signal triggered if the information was recognized as correct, passes on the vehicle-related information at least partially to a terminal provided for one of external diagnostic systems or a diagnostic system provided in the vehicle.

26 Claims, 1 Drawing Figure

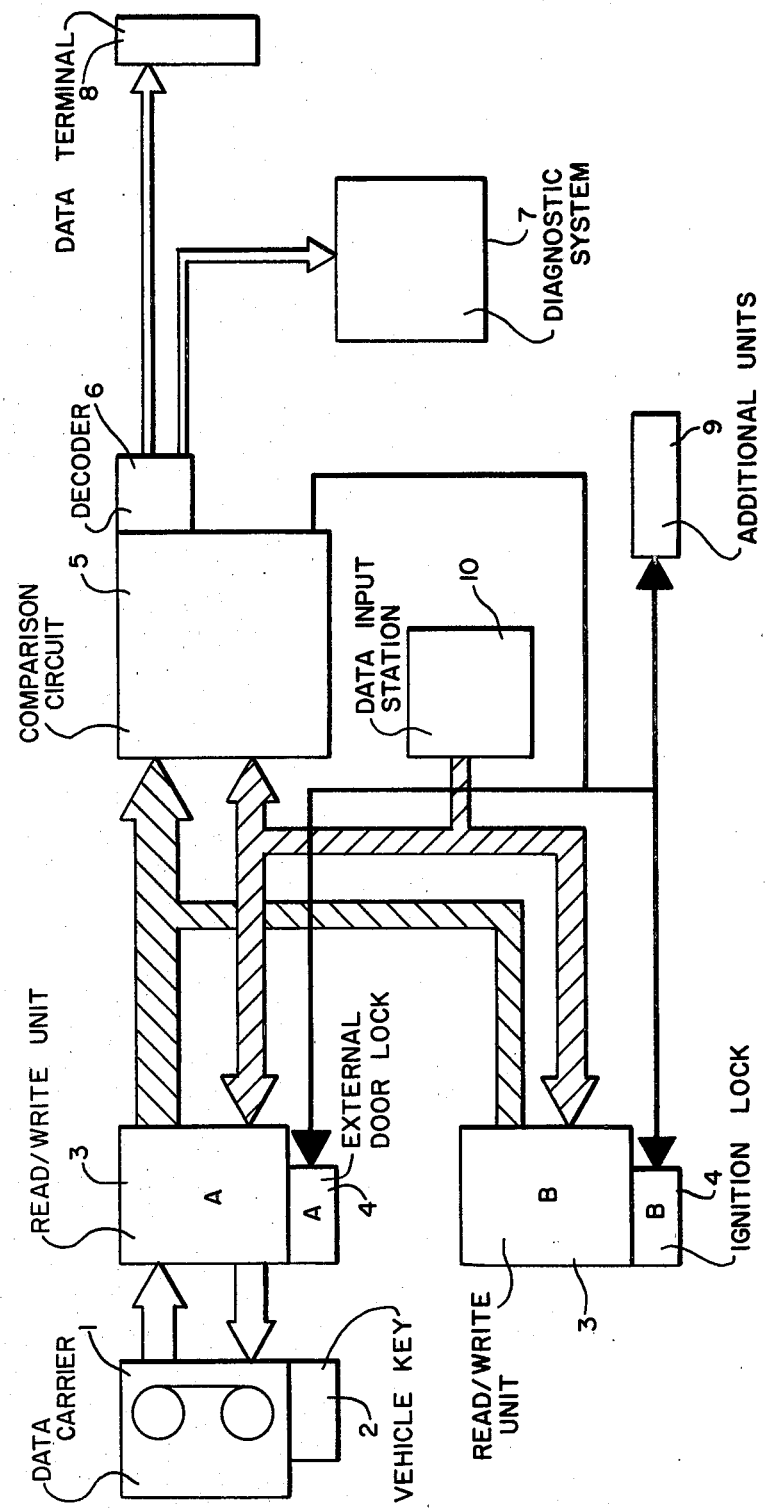

APPARATUS FOR PREVENTING UNAUTHORIZED STARTING OF A MOTOR VEHICLE

The present invention relates to a protection arrangement and, more particularly, to an apparatus for preventing an unauthorized starting of a vehicle, especially a motor vehicle, which apparatus includes a data carrier preferably coordinated to a key normally used for operating mechanical locks of a vehicle and with an evaluating circuit for triggering an output signal if the correct data is provided on the data carrier.

In German Offenlungsschrift No. 2,557,637, an electronic locking mechanism of the aforementioned type is proposed wherein a lock system, having a mechanical latch, is connected to an electronic circuit arrangement for effecting an evaluation and a controlling of a mechanical locking mechanism. The lock system includes at least one key having a component which may be coupled to the electronic circuit and which contains appropriate identifying information. The component triggers an unlocking signal from the electronic circuit arrangement if the correct identifying information is brought into cooperation with the lock system.

Burglarproofing devices of the aforementioned type or of a similar type have been proposed; however, a disadvantage of these proposed devices resides in the fact that all of the proposed devices exclusively have the object of preventing an unauthorized starting of a device or a motor vehicle with the single objective being accomplished at a relatively great expense.

The aim underlying the present invention essentially resides in providing an apparatus for preventing an unauthorized starting of a motor vehicle which combines a burglarproofing apparatus with a diagnostic system for the vehicle units, which diagnostic system is already provided in the vehicle and or represents an external unit thereby rendering the burglarproofing apparatus even more versatile and effective.

In accordance with advantageous features of the present invention, a data carrier is provided which contains unerasable vehicle-related information and/or erasable arbitrary information. An evaluating circuit is provided which includes at least one read/write unit and a comparator which is adapted to compare the total information on the data carrier, i.e., the unerasable and erasable information. The comparator provides or triggers an output signal if the information on the data carrier corresponds to the information contained therein and additionally provides a signal reflecting the vehicle-related information at least partially to a terminal provided for the external diagnose systems and/or to the diagnose system provided within the motor vehicle.

One advantage of the apparatus in accordance with the present invention resides in the fact that a code word, series of code words, or other data fed into the apparatus for burglarproofing the motor vehicle represents a barrier which, in all probability, is insurmountable due to the relatively large amount of information which may be entered in an unknown manner so that an unauthorized entry or start-up of the motor vehicle is prevented with certainty.

In accordance with further advantageous features of the present invention, upon the triggering of an output signal from the comparator, in case of correctly introduced information, the signal is transmitted to a device associated with a lock system of the motor vehicle.

Advantageously, the apparatus of the present invention is associated with an externally accessible lock and, more particularly, to a locking mechanism for a mechanical lock.

It is also possible in accordance with the present invention to associate the apparatus with an ignition lock and to provide at least one of a blocking mechanism for a mechanical ignition lock or for an interruption of a supply of current to the starter of the vehicle.

The vehicle related information on the data carrier may, in accordance with the present invention, include at least one of vehicle identification numbers, desired values, or limit values of the individual units to be diagnosed by the diagnostic system. The arbitrary information on the data carrier may be an indication of, for example, at least one of an odometer reading, an operating hour counter, or a code word which may be fed or inserted into the apparatus.

In accordance with further features of the present invention, a keyboard may be provided in the vehicle and serve as a data input device to feed the arbitrary information such as, for example, the code word into the apparatus. Advantageously, the keyboard may be connected to a housing of the data carrier.

Additionally, in accordance with the present invention, the data carrier for the erasable arbitrary information may be arranged on the housing of the data carrier for the unerasable vehicle-related information.

Moreover, in accordance with the present invention, the evaluating circuit may include a decoder unit which converts the data of the vehicle-related information, arranged for each vehicle in an arbitrary sequence, into data having a fixed sequence for all internal and/or external diagnostic systems.

Accordingly, it is an object of the present invention to provide an apparatus for preventing an unauthorized starting of motor vehicles which avoids, by simple means, shortcomings and disadvantages encountered in the prior art.

Another object of the present invention resides in providing an apparatus for preventing unauthorized starting of a motor vehicle which jointly utilizes the advantages of a burglarproofing device and an internal and/or external diagnostic system of the motor vehicle thereby affording a substantial savings in the expenses of manufacturing the apparatus.

Yet another object of the present invention resides in providing an apparatus for preventing an unauthorized starting of a motor vehicle which functions reliable under all conditions.

A still further object of the present invention resides in providing an apparatus for preventing an unauthorized starting of a motor vehicle which is simple in construction and therefore relatively inexpensive to manufacture.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawings is a schematic block circuit diagram of an apparatus for preventing the unauthorized starting of a motor vehicle in accordance with the present invention.

Before describing, in detail the particular improved apparatus in accordance with the present invention, it should be observed that the present invention resides primarily in a novel structural combination of conventional components and not in the particular detailed configurations thereof. Accordingly, the structure, control and arrangement of these conventional components and circuits have been illustrated in the drawings by readily understandable block representations in order not to obscure the disclosure with structural details which will be readily apparent to those skilled in the art having the benefit of the description herein. Thus, the block diagram of the single FIGURE of the drawing does not necessarily represent the mechanical structural arrangement of the exemplary system but is primarily intended to illustrate the major structural components of the system in a convenient functional grouping so that the present invention can be more readily understood.

Referring now to the single FIGURE of the drawing, according to this FIGURE, a data carrier 1 is provided which contains information on, for example, a recording tape, a recording wire, an optically scannable medium, or other conventional medium. The data carrier 1 includes a housing which is preferably combined into a unit with a mechanical vehicle key 2. The information on the data carrier 1 consists of an unerasable portion, i.e., only readable and/or an erasable, i.e., readable and rewritable portion.

The unerasable portion of the information contained on the data carrier 1 may consist of a word formed of vehicle data such as, for example, engine, chassis number, and/or other part numbers as well as desired and limit values of the vehicle units to be tested by an installed or external diagnostic system. This unerasable portion may, if desired, be supplemented with additional unerasable symbols or data in order to fully utilize the memory capacity of the apparatus. The information or data of the unerasable portion may be put in differently for each type of vehicle in any desired sequence and irrevocably be fixed in the data carrier 1 as well as in an evaluating circuit.

The data carrier 1 and associated mechanical key 2 are adapted to be read or evaluated by an evaluating circuit which includes at least one read/write unit 3 coupled with a mechanical lock 4 which is adapted to be opened and closed by the key 2, a comparison circuit 5 as well as a decoder 6. A diagnostic system 7 which may be a portion of the motor vehicle as well as a data terminal 8 for an external diagnostic system (not shown) are operatively connected to the decoder 6. Appropriate connecting means such as, for example, power lines or the like extend from the comparison circuit 5 to devices (not shown) correlated with the mechanical locks 4 as well as to additional units 9. The devices correlated with the locks 4 act as mechanical blocking mechanisms and/or electrical interrupters.

A data input station 10 is provided to enable a recording or entering of additional arbitrary information into the read/write unit 3 and comparison circuit 5. The arbitrary information may, for example, be an arbitrary variable code word, an actual indication of a reading of the odometer, an operating hour counter, or similar instrumental data which may be provided on the data carrier 1.

In the single FIGURE of the drawing, two read/write units are provided with the unit designated by the reference character A being associated with, for example, an external door lock; whereas, the unit designated by the reference character B being correlated to an ignition lock of the motor vehicle.

The apparatus for preventing an unauthorized starting of the motor vehicle operates in the following manner:

A driver or operator of the motor vehicle inserts the key 2 into an external door lock 4 of the motor vehicle so that the data carrier 1, associated with the key 2, is disposed in a position wherein its total information, consisting of the unerasable vehicle-related information and erasable arbitrary information, may be read by the read/write unit A operatively connected to the lock 4. The information on the data carrier 1 is read by the read/write unit A and is compared, in the comparison circuit 5, with the information stored therein. Upon a coincidence between the information on the data carrier 1 and the information stored in the comparison circuit 5, the comparison circuit 5 transmits an output signal to the lock 4 whereby a blockage of the lock 4 is released and the lock 4 may then be opened.

After gaining entrance to the motor vehicle, the key 2 is then inserted in the ignition lock 4' so that the information contained on the data carrier 1 may then be read by the read/write unit B operatively connected with the lock 4'. The information on the data carrier 1 is read by the read/write unit B and, if the information corresponds to the information contained in the comparison circuit 5, the comparison circuit 5 then transmits an output signal to eliminate a blockage of the ignition lock 4' and/or to eliminate an interruption of electrical current to an additional unit such as, for example, a starter of the vehicle so as to enable the motor vehicle to be started in the usual manner.

With the starting procedure, the decoder 6 is caused to transmit the vehicle-related information stored in the comparison circuit 5, insofar as necessary, to the diagnostic system 7 provided in the vehicle so that the diagnostic system 7 can then test, in a conventional manner, vehicle units connected thereto and advise the operator of the vehicle by way of, for example, indicator lights or displays, the results of the test. By way of the decoder 6, the data required for an external diagnostic device by simultaneously derived from the vehicle related information and fed, in a sequence which is predetermined and which is the same for all vehicles, to the data terminal 8 which may be formed as, for example, a diagnostic plug, together with the terminals of the vehicle units to be tested. The information derivable here is unsuitable for unlocking the locks or connecting the starter by way of the data carrier 1 and comparison circuit 5 because this information is only a fraction of the information required for that purpose in an altered sequence.

When the engine of the motor vehicle is shut-off, i.e., when the key 2 is turned in the ignition lock 4', arbitrary information may be transmitted by way of the data input station 10 to the data carrier 1 and to the comparison circuit 5. The arbitrary information may be introduced either by way of a keyboard arranged in the dashboard of the vehicle or may be automatically provided. The arbitrary information may, for example, be the indication or reading of the odometer of the motor vehicle. Both possibilities may also be effected side by side and it is also possible to combine the keyboard, the data carrier 1 and the key 2 into a single unit. It is also feasible to provide, for the arbitrary information, for example, a magnetic track arranged on the housing of the data carrier 1.

Upon an introduction of a data carrier 1 containing the wrong information, the comparison circuit 5 transmits output signals which, in a conventional manner, may trigger an acoustic or optical alarm and/or block vehicle units which are essential to the operation of the motor vehicle.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. An arrangement for preventing an unauthorized starting of a motor vehicle, the arrangement including a data carrier with a key adapted to operate at least one of mechanical locks and ignition switch means of the motor vehicle and an evaluating circuit means for providing an output signal if data on the data carrier contains predetermined information, characterized in that the data carrier includes at least one of an unerasable portion containing data reflecting vehicle-related information and an erasable portion containing arbitrary information, the evaluating circuit means includes at least one read/write means for reading the data on the data carrier and for enabling a changing of the information on the erasable portion of the data carrier, and a comparison means for comparing the data read by the read/write means with specific data and for providing an output signal upon a coincidence between the read data and the specific data in the comparator means and for forwarding at least a pair of the vehicle-related information to a vehicle diagnostic system.

2. An arrangement according to claim 1, characterized in that the diagnostic system is provided in the motor vehicle.

3. An arrangement according to claim 1, characterized in that the diagnostic system is an external diagnostic system and the comparison means forwards at least a part of the vehicle-related information to a data terminal.

4. An arrangement according to claim 1, characterized in that the output signal of the comparison means is transmitted to a device associated with the mechanical locks of the motor vehicle.

5. An arrangement according to claim 4, characterized in that the device associated with the mechanical locks of the motor vehicle is a blocking means for blocking the mechanical locks.

6. An arrangement according to claim 1, characterized in that the output signal of the comparison means is transmitted to a device associated with the ignition switch means of the vehicle.

7. An arrangement according to claim 6, characterized in that the device associated with the ignition switch means is a blocking means for one of blocking a mechanical ignition lock and controlling a supply of current to a starter of the motor vehicle.

8. An arrangement according to claim 1, characterized in that the key is adapted to operate both mechanical locks of the motor vehicle and the ignition switch means of the motor vehicle.

9. An arrangement according to claim 8, characterized in that the output signal of the comparison means is transmitted to a device associated with the mechanical locks of the motor vehicle and to a device associated with the ignition switch means.

10. An arrangement according to claim 9, characterized in that the device associated with the mechanical locks of the motor vehicle is a blocking means for blocking mechanical locks, and in that the device associated with the ignition switch means of the motor vehicle is a blocking means for one of blocking a mechanical ignition lock and for controlling a supply of current to a starter of the motor vehicle.

11. An arrangement according to one of claims 1 or 2, characterized in that the vehicle-related information on the data carrier includes at least one of vehicle identification numbers, desired operating values of individual vehicle units, and limit values of individual vehicle units.

12. An arrangement according to claim 11, characterized in that the arbitrary information includes at least one of an odometer reading, a number of operating hours of the motor vehicle, and a code word.

13. An arrangement according to claim 12, characterized in that a keyboard means is provided for enabling a feeding of the arbitrary information into the read/write means and comparison means.

14. An arrangement according to claim 13, characterized in that the keyboard is arranged in a dashboard of the motor vehicle.

15. An arrangement according to claim 14, characterized in that the keyboard means is arranged at a housing of the data carrier.

16. An arrangement according to one of claims 1, 2, or 3, characterized in that the data carrier includes a housing and in that the erasable arbitrary information is arranged on the housing of the data carrier.

17. An arrangement according to one of claims 1, 2, or 3, characterized in that the evaluating circuit means further includes a decoder means for converting the data reflecting the vehicle-related information into data having a fixed sequence for the diagnostic system.

18. An arrangement according to claim 17, characterized in that the data reflecting vehicle-related information is provided on the data carrier in an arbitrary sequence.

19. An arrangement having a carrier and for preventing unauthorized starting of a motor vehicle having at least a diagnostic system,
the method comprising
providing a key with said carrier having unerasable data reflecting vehicle-related information and erasable data containing arbitrary information thereon,
evaluating at least one of unerasable data reflecting vehicle-related information and erasable data containing arbitrary information,
enabling a changing of the erasable data,
comparing data from at least one of said unerasable and erasable data with specific data to produce an output signal in response to a determination that a predetermined relationship exists between said compared data, and
forwarding at least a pair of unerasable data to said diagnostic system.

20. An arrangement according to claim 19 wherein the step of forwarding is performed for a diagnostic system in the motor vehicle.

21. An arrangement according to claim 19 comprising the step of forwarding at least a portion of the unerasable data to a data terminal.

22. An arrangement having locks and ignition means according to one of claims 19, 20, or 21, comprising the step of operating at least one of said locks and ignition means in response to said comparison step.

23. An arrangement having locks and ignition means according to one of claims 19, 20, or 21 comprising the step of blocking at least one of said locks and ignition means in response to said comparison step.

24. An arrangement according to claim 19, comprising the step of keyboarding said erasable data containing arbitrary information for comparison.

25. An arrangement according to claim 19, comprising the step of decoding the data reflecting the vehicle-related information into data having a fixed sequence for the diagnositc system.

26. Arrangement according to claim 19 having a carrier, comprising the step of entering the data reflecting vehicle-related information in an arbitrary sequence on said carrier.

* * * * *